Jan. 19, 1954          C. SUTCH          2,666,220

DENTAL BURR CLEANER AND STERILIZER

Filed Oct. 18, 1952          2 Sheets-Sheet 1

*INVENTOR.*
CRESTON SUTCH

BY

ATTORNEY.

Jan. 19, 1954 C. SUTCH 2,666,220
DENTAL BURR CLEANER AND STERILIZER
Filed Oct. 18, 1952 2 Sheets-Sheet 2
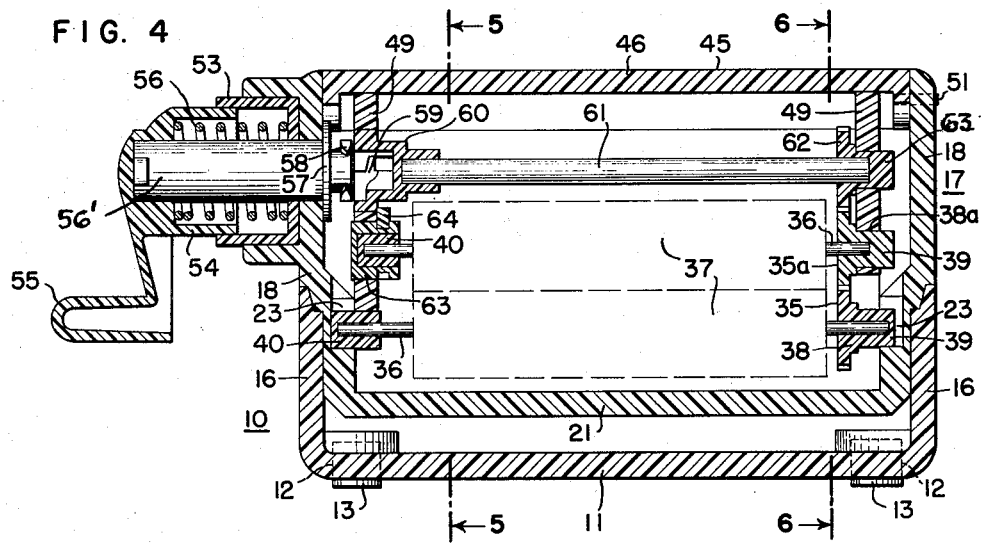
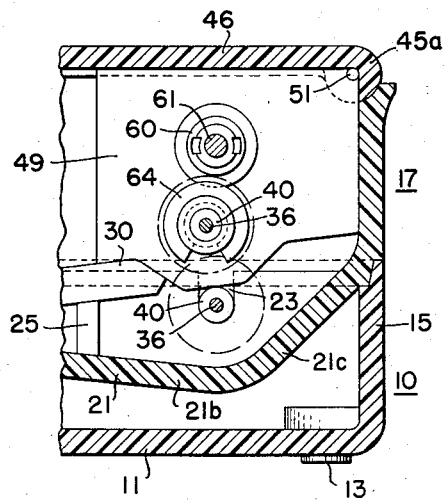
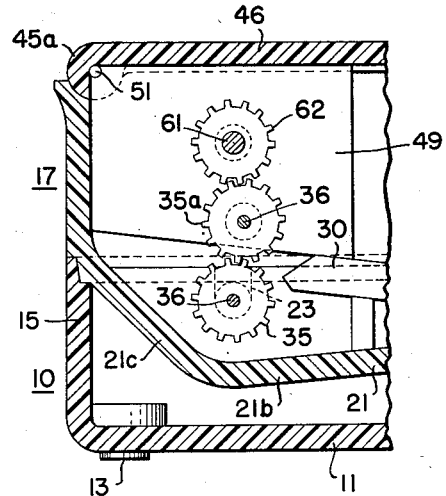
INVENTOR.
CRESTON SUTCH
BY
ATTORNEY.

Patented Jan. 19, 1954

2,666,220

UNITED STATES PATENT OFFICE 2,666,220

DENTAL BURR CLEANER AND STERILIZER

Creston Sutch, Glenside, Pa.

Application October 18, 1952, Serial No. 315,525

7 Claims. (Cl. 15—21)

This invention relates to cleaners and sterilizers for dental burrs.

Dental burrs, after use on an individual patient, require cleaning to remove the fragments of material abraded from the tooth worked upon, and also require sterilizing before use on another patient. No satisfactory apparatus has heretofore been provided for this purpose, manual cleaning of each individual burr being the usual practice.

It is the principal object of the present invention to provide apparatus for cleaning and sterilizing dental burrs which is compact, easy to use and with which an effective cleaning and sterilizing action is obtained.

It is a further object of the present invention to provide apparatus for cleaning and sterilizing dental burrs having provisions for the reception and storage of a plurality of burrs preliminary to cleaning.

It is a further object of the present invention to provide apparatus for cleaning and sterilizing dental burrs in which a holder is provided, adapted to be positioned for the reception and storage of a plurality of dental burrs prior to cleaning and sterilizing and adapted to be positioned at another location to hold the burrs during the cleaning and sterilizing operations.

It is a further object of the present invention to provide apparatus for cleaning and sterilizing dental burrs having a plurality of rotary brushes which are readily removable for replacement.

It is a further object of the present invention to provide apparatus for cleaning and sterilizing dental burrs having a tray portion for the retention of a sterilizing liquid.

It is a further object of the present invention to provide apparatus for cleaning and sterilizing dental burrs having a tray portion for the retention of a sterilizing liquid within which a cleaning brush is rotated.

Other objects and advantageous features of the invention will be apparent from the specification and claims.

The nature and characteristic features of the invention will be more readily understood from the following description, taken in connection with the accompanying drawings forming part hereof, in which:

Fig. 4 is an enlarged vertical sectional view taken approximately on the line 4—4 of Fig. 2;

Fig. 5 is a vertical sectional view taken approximately on the line 5—5 of Fig. 4; and Fig. 6 is a vertical sectional view taken approximately on the line 6—6 of Fig. 4.

Figure 1:
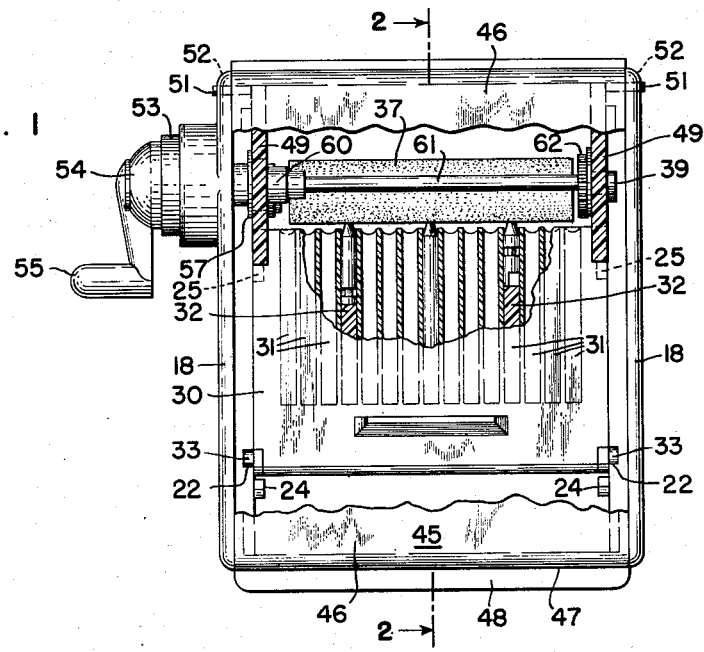
Figure 1 is a top plan view of a dental burr cleaner and sterilizer in accordance with the present invention, parts being broken away to show the details of construction.
Figure 2:
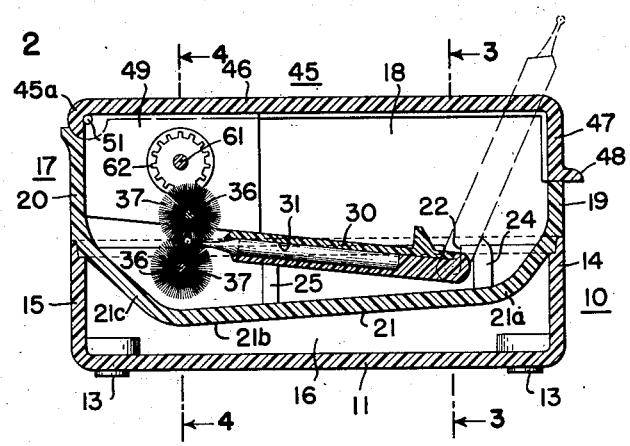
Fig. 2 is a vertical sectional view taken approximately on the line 2—2 of Fig. 1.
Figure 3:
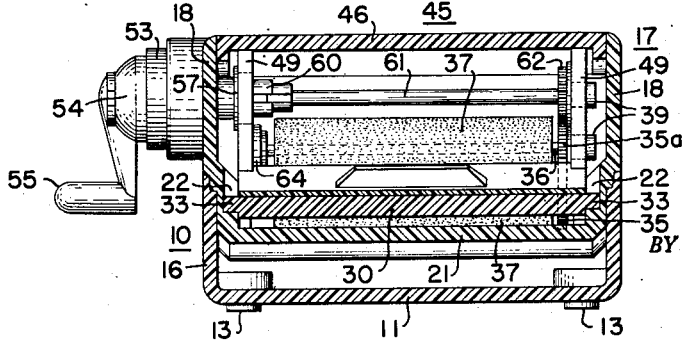
Fig. 3 is a vertical sectional view taken approximately on the line 3—3 of Fig. 2.

It should, of course, be understood that the description and drawings herein are illustrative merely and that various modifications and changes can be made in the structure disclosed without departing from the spirit of the invention.

Like numerals refer to like parts throughout the several views.

Referring now more particularly to the drawings, in which a preferred embodiment of the invention is illustrated, a base 10 is provided having a horizontal bottom wall or floor 11 with spaced openings 12 for the insertion of pads 13 of friction material such as rubber or felt which serve as supporting feet and tend to prevent accidental sliding movement of the base 10.

The base 10 also has vertically upwardly extending front, rear and side walls 14, 15 and 16, adapted for the permanent reception and support of an upper housing section 17. The upper housing section 17 has a plurality of opposite vertical side walls 18, a vertical front wall 19, which terminates at a location spaced below the upper edge of the side walls 18, a vertical rear wall 20 and a bottom wall 21. The bottom wall 21 is preferably formed integral with the walls 18, 19, and 20, has a front downwardly extending portion 21a, a major intermediate portion 21b thereof inclined downwardly towards the rear wall 20, and a rear downwardly extending portion 21c. The side walls 18 are provided at the front portion thereof and in spaced relation to the wall portion 21b with slots 22, and at the rear portion thereof in spaced relation to the bottom wall 21, and preferably above the lowermost part of the bottom wall portion 21b with slots 23, for purposes to be explained. The side walls 18 are also preferably provided forwardly of the slots 22 with inwardly extending abutments 24 and intermediate the slots 22 and the slots 23 with inwardly extending abutments 25.

A holder 30 is provided preferably in the form of a plate, with a plurality of cylindrical openings or spaces 31 extending inwardly from one edge thereof and parallel to the side faces of the holder 30. The openings 31 are preferably of the maximum depth required for the reception of the shanks of burrs now in use but with the cutting end of the burr exposed and accessible. Inserts 32 are preferably provided, of different lengths for insertion in the openings 31, where burrs having shanks of shorter length are to be accommodated. The holder 30 is provided, at the portion thereof opposite the openings 31 with outwardly extending pins 33 for reception in the slots 22 to provide a pivotal mounting for the holder 30.

It will be noted that with the pins 33 in the slots 22 the holder 30 may be swung to an upward forwardly inclined position in engagement with the abutments 24 or to a downward position in engagement with the abutments 25. The holder 30 may also be readily removed if desired by lifting it to disengage the pins 33 from the slots 22.

A lower brush assembly 35 is provided which preferably includes a central wire core 36 having helically disposed bristles 37, of the desired material such as wire, nylon, or the like. The core 36 at one end is preferably received within a mounting gear 38. The gear 38 has a cylindrical extension 39 which is adapted to be received in the slot 23 in one of the side walls 18, the other end of the core 36 having a thimble 40 mounted thereon for reception in the opposite side wall slot 23.

It will be noted that the lower brush assembly 35 is thus removably mounted in the slots 23 for rotation, and can be readily removed for inspection or replacement merely by manually lifting it out of the slots 23.

A cover 45 is provided, preferably having a top wall 46, and a front wall 47 extending downwardly to the upper margin of the front wall 19, and abutting against the upper edge of the front wall 19 in closed position. The front wall 47 may have a rim 48 thereon for facilitating the raising of the cover 45. The cover 45 also has an end enlargement 45a for the reception of hinge pins 51 which engage in sockets 52 in the upper portions of the side walls 18. The cover 45 on the inner or lower face thereof has a pair of spaced parallel walls 49.

One of the side walls 18 has mounted thereon a sleeve 53 for the reception of a sleeve 54, the sleeve 54 forming part of a handle 55. A spring 56 is interposed in the interior of the sleeves 53 and 54 and normally urges the sleeve 54 outwardly.

Within the interior of the sleeves 53 and 54, for turning by the handle 55, a stub shaft 56' is provided having a collar 57 thereon for limiting the outward movement thereof. The inner end of the shaft 56 has projections 58 for engagement when desired in complemental recesses 59 formed in a driving collar 60 mounted in the contiguous wall 49. The collar 60 has a drive shaft 61 extending therefrom to a gear 62, the gear 62 having a cylindrical extension 63 thereon which is journalled in the opposite wall 49.

An upper brush assembly 35a is provided, preferably similar to the lower brush assembly 35, the only difference being the length of the core 36. By severing an end portion of the core 36 of a lower brush assembly 35 it may be readily adapted for use as an upper brush assembly 35a. The upper brush assembly 35a has on the core 36, helically disposed bristles 37, and it has a mounting gear 38a which is in continuous engagement with the gear 62. The extension 39 is journalled in the opposite wall 49. The gear 38a is adapted for engagement, when the cover 45 is in its downward position, with the gear 38 of the lower brush assembly 35. In this position of the cover 45, also, a portion of the bristles 37 of the upper brush assembly 35a is in engagement or intermeshed with a portion of the bristles 37 of the lower brush assembly 35.

The upper brush assembly 35a has the thimble 40 thereof preferably received within a socket 63 held by a split ring 64 which is removable for initial insertion or replacement of the upper brush assembly 35a.

It will be noted that when the cover 45 is swung upwardly and preferably to a substantially vertical position the upper brush assembly 35a is separated from the lower brush assembly 35 by reason of its mounting in the walls 49 of the cover 45.

While the upper housing section 17, holder 30 and cover 45 may be made of any desired material, it is preferred to employ a synthetic plastic material of inert character and which is not subject to action by the antiseptic solution employed for sterilizing the burrs. For this purpose an acrylic resin has been found satisfactory. The gears 38, 38a and 62, and the thimbles 40 may also be made of any desired material which is resistant to the antiseptic solution, and for this purpose nylon has been found suitable.

The mode of use will now be pointed out.

Prior to use, a suitable quantity of desired antiseptic or sterilizing solution is introduced into the upper housing section 17 and preferably in sufficient quantity to extend above the uppermost portion of the bristles 37 of the lower brush assembly 35.

With the cover 45 raised, the holder 30 is normally swung to its upwardly extending position in engagement with the abutments 24. The dentist, as he finishes with a burr, places the shank of the burr in one of the openings 31 and in accordance with the length of the shank of the burr selects if necessary an opening 31 in which an insert 32 of proper length has been provided.

When the dentist has completed his work on a patient the holder 30 is then swung downwardly until it rests on the abutments 25 and the cover 45 is lowered until the front wall 47 abuts against the upper edge of the front wall 19. The handle 55 is pressed inwardly against the force of the spring 56 to engage the projections 58 in the recesses 59 and the shaft 61 is rotated. Upon rotation of the drive shaft 61, the gear 62 thereon drives the gear 38a which gear, in turn, drives the gear 38. The upper brush assembly 35a and the lower brush assembly 35 are thus rotated so that the bristles thereof are brought into engagement with the cutting portions of the burrs. As the brush assemblies 35 and 35a are manually rotated, a rotating movement is also preferably imparted to the cutting portions of the burrs so that all portions of the cutting edges and the spaces therebetween are brushed as antiseptic liquid is applied thereto. The burrs may be left immersed in the antiseptic solution for the desired time interval, dependent upon the antiseptic employed, which may be of the order of 10 minutes.

Prior to raising the cover 45, the handle 55 may again be turned a few times to remove any adherent particles on the burrs not previously removed. On raising the cover 45, the upper brush assembly 35a is raised so that the holder 30 may be swung upwardly to its forwardly inclined position and the burrs may then be removed and stored in their customary holders. The holder 30 is then ready to receive additional burrs used on the next patient.

I claim:

1. Dental burr cleaning apparatus comprising a housing having an interior portion providing a liquid receptacle, a rotary brush mounted in said receptacle, a second rotary brush engaging said first mentioned brush, driving means for said brushes, a movable burr holder supported by said housing, and members for positioning said burr holder in one position for the reception of a plurality of dental burrs with the cutting portions exposed and for positioning said burr holder in another position with the cutting ends of the burrs between said brushes.

2. Dental burr cleaning apparatus comprising a housing having an interior portion providing a liquid receptacle, a rotary brush removably mounted in said receptacle and having its rotational axis horizontally disposed, a second rotary brush removably engaging said first mentioned brush, driving means for said brushes, a movable burr holder supported by said housing, members for positioning said holder in an upwardly disposed position for the reception of a plurality of dental burrs with the cutting portions exposed, and members for positioning said holder in a position with the cutting ends of the burrs between said brushes.

3. Dental burr cleaning apparatus comprising a housing having an interior portion providing a liquid receptacle, a rotary brush mounted in said receptacle and having its rotational axis horizontally disposed, a second rotary brush removably engaging said first mentioned brush, driving means for said brushes, a burr holder pivotally supported by said housing, members for positioning said holder in an upwardly disposed position for the reception of a plurality of dental burrs with the cutting portions exposed, and members for positioning said holder in a position with the cutting ends of the burrs between said brushes.

4. Dental burr cleaning apparatus comprising a lower housing having an interior portion providing a liquid receptacle, a rotary brush mounted in said receptacle and having its rotational axis horizontally disposed, a cover for said housing movable from a closed position to an open position, a second rotary brush carried by said cover and engaging said first mentioned brush when said cover is in closed position, driving means for said brushes, a movable burr holder supported by said housing, members for positioning said burr holder in an upwardly disposed position for the reception of a plurality of dental burrs with the cutting portions exposed and for positioning in a position with the cutting ends of the burrs between said brushes.

5. Dental burr cleaning apparatus comprising a lower housing having an interior portion providing a liquid receptacle, a rotary brush mounted in said receptacle and having its rotational axis horizontally disposed, a cover for said housing hingedly connected thereto and movable from a closed position to an open position, a second rotary brush rotatably mounted in said cover and engaging said first mentioned brush when said cover is in closed position, driving means for said brushes, a burr holder pivotally supported by said lower housing, members for positioning said holder in an upwardly disposed position for the reception of a plurality of dental burrs with the cutting portions exposed, and members for positioning said holder in a position with the cutting portions of the burrs between said brushes.

6. Dental burr cleaning apparatus comprising a lower housing having opposite vertical side walls and having an interior portion providing a liquid receptacle, a rotary brush removably mounted in slots in said side walls and having its rotational axis horizontally disposed, a cover for said housing movable from a closed position to an open position, a second rotary brush rotatably mounted in said cover with its rotational axis parallel to the rotational axis of said first mentioned brush and engaging said first mentioned brush when said cover is in closed position, driving means for said brushes mounted on one of said side walls, a burr holder pivotally supported by said side walls, members for positioning said holder in an upwardly disposed position for the reception of a plurality of dental burrs with the cutting portions exposed, and members for positioning said holder in a position with the cutting ends of the burrs between said brushes.

7. Dental burr cleaning apparatus comprising a housing having a front wall, a rear wall and vertical side walls and an interior portion providing a liquid receptacle, a rotary brush removably mounted at its ends in said side walls and having its rotational axis horizontally disposed, a cover for said housing hingedly connected to said rear wall and movable from a closed position to an open position, a second rotary brush rotatably carried by said cover with its rotational axis parallel to the rotational axis of said first mentioned brush and engaging said first mentioned brush when said cover is in closed position, driving means for said brushes mounted on said cover, said brushes having interengaging gears driven by said driving means, a burr holder pivotally supported by said side walls, members for positioning said holder in an upwardly disposed position for the reception of a plurality of dental burrs with the cutting portions exposed, and members for positioning said holder in a position with the cutting ends of the burrs between said brushes.

CRESTON SUTCH.

References Cited in the file of this patent

UNITED STATES PATENTS

| Number | Name | Date |
|---|---|---|
| 1,392,189 | Makie | Sept. 27, 1921 |

FOREIGN PATENTS

| Number | Country | Date |
|---|---|---|
| 290,641 | Great Britain | Aug. 30, 1928 |